United States Patent
Yeduvakula

(10) Patent No.: US 9,578,500 B1
(45) Date of Patent: Feb. 21, 2017

(54) AUTHENTICATION VIA MOBILE TELEPHONE

(71) Applicant: Amazon Technologies, Inc., Reno, NV (US)

(72) Inventor: Kamesh Rao Yeduvakula, Maharashtra (IN)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 14/033,268

(22) Filed: Sep. 20, 2013

(51) Int. Cl.
*H04W 12/06* (2009.01)

(52) U.S. Cl.
CPC .................................. *H04W 12/06* (2013.01)

(58) Field of Classification Search
IPC .............................. G06F 21/313; H04W 12/06
See application file for complete search history.

(56) References Cited

U.S. PATENT DOCUMENTS

| | | | | |
|---|---|---|---|---|
| 5,826,245 A * | 10/1998 | Sandberg-Diment | .. G06Q 20/02 | 705/39 |
| 7,574,733 B2 * | 8/2009 | Woodhill | .............. G06F 21/313 | 705/75 |
| 2001/0037264 A1 * | 11/2001 | Husemann | ............. G06Q 20/04 | 705/26.81 |
| 2002/0133708 A1 * | 9/2002 | Gudorf | ................... G06F 21/33 | 713/186 |
| 2004/0030926 A1 * | 2/2004 | Clark | ................. H04L 63/0428 | 726/1 |
| 2004/0088551 A1 * | 5/2004 | Dor et al. | ...................... 713/182 |
| 2005/0102381 A1 * | 5/2005 | Jiang | ..................... H04W 12/08 | 709/220 |
| 2006/0156385 A1 * | 7/2006 | Chiviendacz | .......... G06F 21/36 | 726/2 |
| 2007/0005331 A1 * | 1/2007 | Han | ....................... G06Q 99/00 | 703/22 |
| 2007/0203850 A1 * | 8/2007 | Singh | ................... G06Q 20/327 | 705/67 |
| 2008/0163381 A1 * | 7/2008 | Inaba | ............................. 726/28 |
| 2010/0250929 A1 * | 9/2010 | Schultz et al. | ................ 713/168 |
| 2011/0072039 A1 * | 3/2011 | Tayloe | ............... G06F 21/6218 | 707/769 |
| 2011/0258062 A1 * | 10/2011 | Hirson | ................... G06Q 20/24 | 705/26.1 |
| 2011/0313924 A1 * | 12/2011 | Carell | .................... G06Q 20/10 | 705/43 |

* cited by examiner

*Primary Examiner* — Taghi Arani
*Assistant Examiner* — Phy Anh Vu
(74) *Attorney, Agent, or Firm* — Thorpe North & Western LLP

(57) ABSTRACT

A technology to authenticate a user is described. A mobile telephone number associated with a user identification is identified. A message including a confirmation telephone number for authorization is sent to a mobile telephone, and a mobile telephone reply is initiated to the confirmation telephone number from the mobile telephone number to authenticate the user identification.

17 Claims, 8 Drawing Sheets

AUTHENTICATION VIA MOBILE TELEPHONE

BACKGROUND

Username and password combinations are often used to authenticate to various electronic services. With an increasing number of electronic services available on the Internet, remembering passwords may sometimes be difficult. As a result, some users may reuse passwords across multiple sites. This reuse of passwords across multiple sites may be problematic for security. For example, if an individual's password is compromised on one site, other sites using that same password (and especially the same username and login) may also be vulnerable as a result of the compromised site.

Further, sites that require a username and password may run the risk of lost business. A user may be discouraged by having to create a new username and password combination for each site. So, a user may create fewer accounts for electronic services because of the burden of having a large number of accounts.

Entering a username and password combination on a mobile telephone may be particularly cumbersome for users. Many mobile telephones have limited space for a keyboard or other means by which to enter text corresponding to the username and password combination. As a result, dealing with multiple sites using a username and password combination may even more burdensome with mobile telephones.

DETAILED DESCRIPTION

Figure 1:
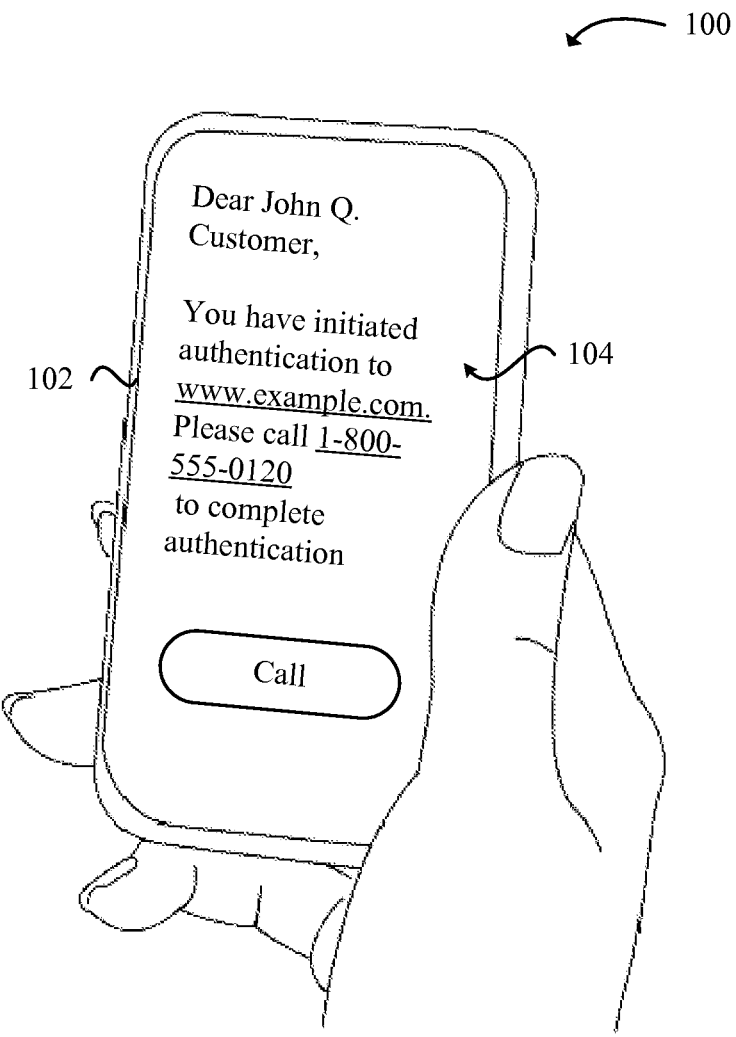
FIG. 1 illustrates an example of a mobile telephone authenticating to a site.

An electronic site authentication technology is described that may allow a user to more easily authenticate to a site using a mobile telephone. Upon visiting a site, a user may enter a user identification (e.g., login or username). The user identification may be linked to a mobile telephone number that has been previously obtained from the user, and the site may send a message to the mobile telephone number. The message may indicate that a device associated with the mobile telephone number may call a confirmation telephone number to authenticate the user to the site. The call can then be placed by the mobile telephone to the confirmation telephone number. For example, the site can then recognize that the confirmation telephone number has been called within a specific time period. Then the user may be authenticated to the site based on the call to the appropriate number during the defined time period.

In one example, a user may use a browser on a desktop computer to visit a site and enter a user identification for an account with the site. Authentication may then take place using the mobile telephone number and the confirmation telephone number. Once authenticated, the browser on the desktop computer may be granted access to the account on the site.

In another example, a specific number of rings may be checked for and a program may control the number of rings sent from a smart mobile telephone (i.e., smart phone). In yet a further example, the message may indicate that a device associated with the mobile telephone number may send a text message to the confirmation telephone number to authenticate the user to the site. The message may include a passcode (e.g. password, personal identification number (PIN), passphrase, etc.) and the text message sent to the confirmation telephone number may include the passcode as an additional security mechanism.

The technology may enable authentication to various services and sites without using a password, for example. Additionally, site security may be increased as result, since users may avoid maintaining similar or identical passwords that might be used across multiple sites. Further, security may be enhanced since users are authenticated using a physical, personal device. That is, the user generally may be in possession of the mobile telephone used for authentication.

The technology may also allow commercial or other types of sites to provide an easier method for authentication where a user can avoid the creation and memorization of more passwords. In that way, a user may be more readily encouraged to create an authentication account at a site. The technology may be particularly useful for devices that have limited means to enter text. With the technology, a user may be able to authenticate to a site with a minimal amount of text entry. For instance, a user may access a site by entering a site address through the mobile telephone and then authenticate to the site through mobile telephone without using a password, as described above.

Accordingly, FIG. 1 illustrates an example of a mobile telephone device 100 authenticating to a site. In particular, the mobile telephone device 100 may include a screen 102 with the message 104 displayed thereon. A user may have signed up the mobile telephone device 100 with an authentication system for a site. More specifically, the user may have previously entered a mobile telephone number associated with the mobile telephone device 100 on a site. In this way, the user's identification (e.g., login) becomes associated to the mobile telephone number.

After returning to the site, a user may enter a user identification (e.g. a username, an email, etc.). For example, a user may use a browser on a laptop computer or a mobile device to return to the site and enter the user identification. The user identification for the site may be received from the user, and the site retrieves the mobile telephone number associated with the user identification.

The site may be connected to a bank of telephone numbers on which the site may receive incoming telephone calls. The bank of telephone numbers may be hosted with the site or may be provided as a service independent from the site, and the site or a server associated with the site may interface with the service for the telephone numbers. The bank of telephone numbers may be a group of telephone numbers or may be a single telephone number with multiple extensions. In general, the bank of telephone numbers may be large enough to provide a random incoming call route in order to provide a certain level of security.

In another example configuration, the site may send a simple messaging service (SMS) message (i.e. a text message) to the mobile telephone device 100 by using the mobile telephone number previously associated with the user identification. For instance, as depicted in FIG. 1, the message 104 indicates that the user John Q. Customer, has initiated an authentication to the site 'www.example.com'. Further, the message 104 requests that the user call '1-800-555-0120' to complete authentication. In addition to links within the message 104, the message 104 may also provide a call button to help direct the user to complete authentication. Thus, the text message may contain a confirmation telephone number to call for authorization.

Upon clicking on the link '1-800-555-0120' or the call button in the message 104, the mobile telephone device 100 may initiate a call to the telephone bank. Using the telephone bank, the site may identify the incoming telephone call from the mobile telephone number of the mobile telephone device 100 at '1-800-555-0120' to authenticate the user to the site.

The incoming telephone call may be a missed call, an answered call, or the telephone call may authenticate with a predetermined number of rings. For instance, a user may specify that the user may be authenticated upon seven rings. The predetermined number of rings may offer a higher level of security, while still allowing a simple authentication method.

Another way to provide a higher level of security is to randomly select the confirmation telephone number that may be used for the authentication from a group of telephone numbers. The larger the group of telephone numbers from which the confirmation telephone number is selected, then the higher the level of security that may be provided. Additionally, the confirmation telephone number may be valid for authentication for a predetermined amount of time. In this way, a mobile telephone reply using the confirmation telephone number is time limited and may not be used outside that time period for the mobile telephone used in the authentication.

Figure 2:
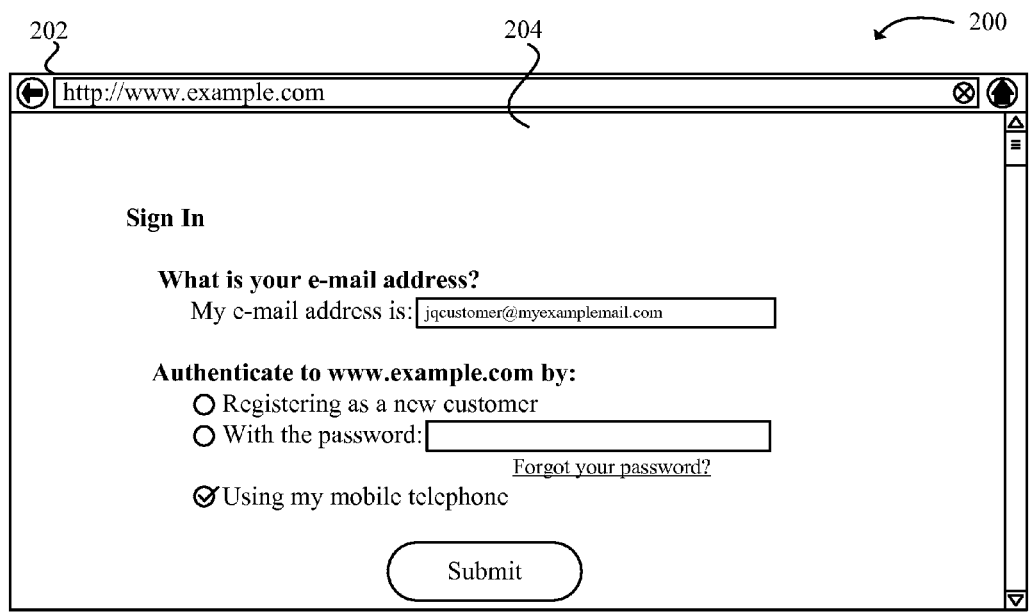
FIG. 2 illustrates an example of a user interface for authenticating to a site.

FIG. 2 illustrates an example of a user interface 200 for authenticating to a site. The user interface 200 may be used to provide a user identification for a site to initiate authentication. The user interface 200 may include a browser 202 with a page 204 rendered therein. The browser may run on any computing device including a desktop computer, a laptop or a mobile telephone. While authentication may take place with a mobile telephone, the browser may run on the same mobile telephone or on a separate device. In particular, the page 204 is a page to login to the site. The page 204 may request an email address and an option for using a mobile telephone to authenticate to the site. By submitting the page, the user may request an authentication. That is, a message (e.g. a text message) may then be sent to the mobile telephone number associated with the user identification (e.g. the email address provided on the page 204). More precisely, the site may retrieve the mobile telephone number associated with the user identification, and send a message including a confirmation telephone number for authorization.

As discussed above with reference to FIG. 1, a mobile telephone reply may be identified as being from the mobile telephone number and to the confirmation telephone number to authenticate the user identification. The mobile telephone reply, for instance, may be a missed incoming telephone call to the confirmation telephone number or may be any sort of reply authentication from the mobile telephone number, such as a text message to the confirmation telephone number.

To increase the security of the reply from the mobile telephone, a passcode may be sent in a text message sent by the mobile telephone. This passcode may be a code displayed on the site or may be originally supplied in a text message to the mobile telephone. Further, authentication of the user identification to the site may be limited in duration and the site may revoke authentication to the site after a predetermined amount of time. Thus, the user may have to re-authenticate after a given period of time. Authentication may also be revoked after a period of inactivity. Additionally, authentication of the user identification may be limited in the account areas in which access is granted through the authentication. For example, access to the site may be limited to non-modifying account functions. In this way, authentication of the user identification may be limited in duration and functionality.

Another way to increase the security of the authentication may be through associating a mobile telephone device's international mobile station equipment identity (IMEI) (or a similar mobile device hardware identifier) with the mobile telephone number registered with the site. An IMEI may be a number that may uniquely identify a mobile telephone. For example, an application on a smart mobile telephone may provide the IMEI to the site as part of the mobile telephone reply. In one example, identifying the mobile telephone reply may include verifying the IMEI of the mobile telephone reply.

Figure 3:
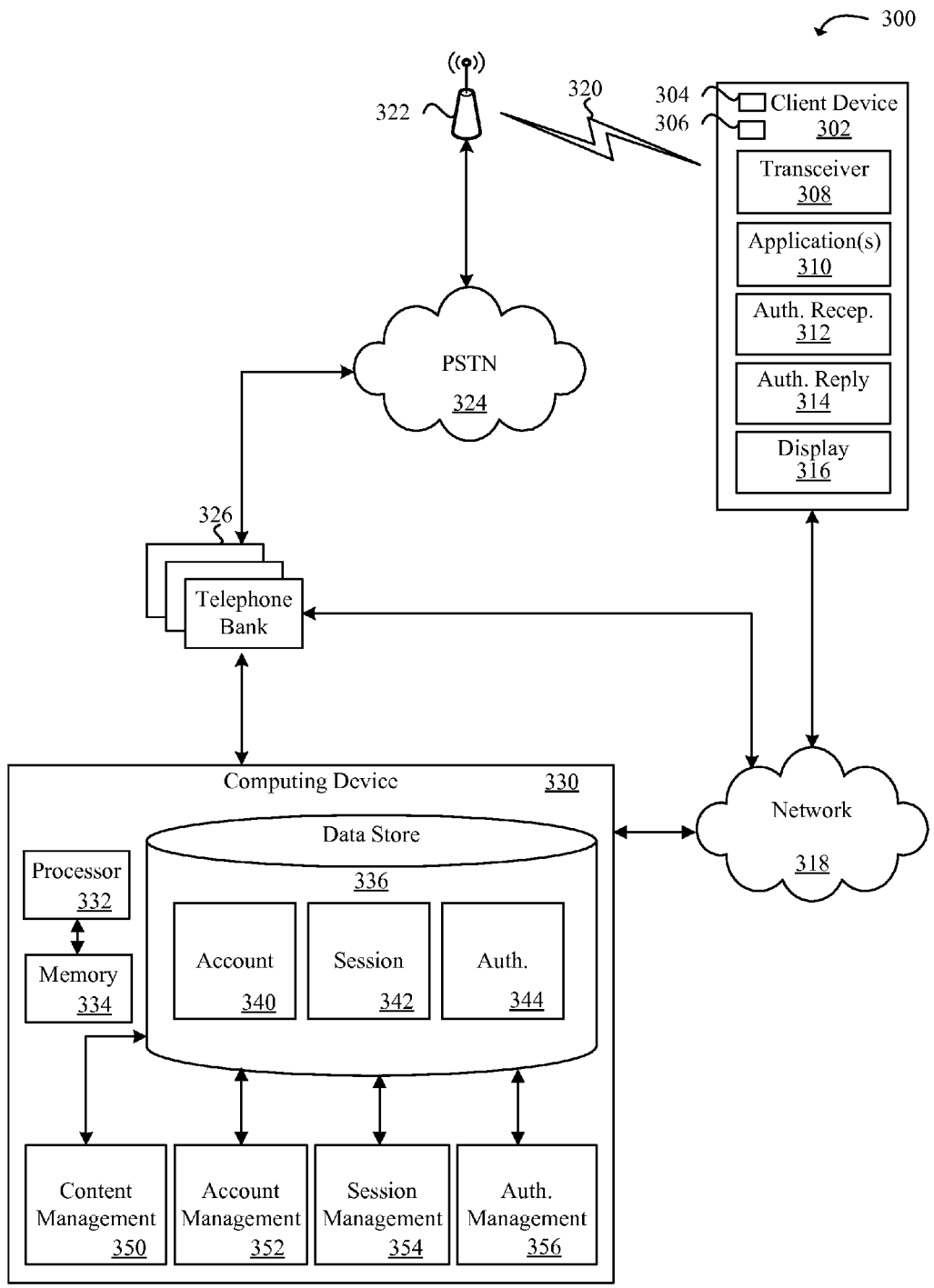
FIG. 3 is a component block diagram illustrating an example system to authenticate to a site.

FIG. 3 is a component block diagram illustrating an example system 300 to authenticate to a site. The system 300 may be used to implement the functionality heretofore described with reference to FIGS. 1-2 or other exemplary functionality discussed below, including functionality described with reference to FIGS. 4-8. The system 300 may include the client device 302 connected to a computing device 330 over a network 318. The client device 302 may include a transceiver 308 providing a wireless communication link 320 to a base station 322 in a wireless cellular network. The base station 322 may connect to a publicly switched telephone network (PSTN) 324. Further, the PSTN 324 may be communicatively connected to a telephone bank 326 which in turn is communicatively connected the computing device 330. The telephone bank 326 may include components such as a private branch exchange (PBX), a hosted exchange, a software PBX, a computer server, or other components that may facilitate connecting the telephone bank 326 to the PSTN 324, the computing device 330, and/or the network 318.

The telephone bank 326 may also be connected to the network 318 and provide telephonic services through the network 318 to supplement the telephone service provided by the PSTN 324 or as an alternative to the PSTN 324. For instance, the telephone bank 326 may include a voice over IP (VoIP) interface by connecting to the network using the Internet protocol (IP) and providing telephony with a VoIP protocol.

The PSTN 324 may be a network of public circuit-switched telephone networks and may include telephone lines, fiber optic cables, microwave transmission links, cellular networks, communications satellites, and undersea telephone cables interconnected by telephone switching centers. Thus, the PSTN 324 may allow one telephone to communicate with another telephone via the PSTN.

The client device 302 may, for example, be a mobile telephone device with a processor 304 in the memory 306. Further the client device 302 may include an application 310, an authentication reception module 312, an authentication reply module 314 and a display 316. The application 310 may interact with a site hosted, for instance, on the computing device 330 and request authentication.

The authentication reception module 312 may receive a message including a confirmation telephone number for authorization in response to initiating the authentication. A text messaging application may be used, for instance, as part of the authentication reception module or the entire authentication reception module. Other software may also be used alone or in conjunction with the text messaging application to receive the message that includes a confirmation telephone number for completing the authorization in response to initiating the authentication. In this way, the mobile telephone reply may be a semi-automated reply by an application on the device, and the user may interact with the application to effectuate the mobile telephone reply. For example, a user may click an "Okay" button to signal acceptance in sending the mobile telephone reply.

The authentication reply module 314 may provide a mobile telephone reply to the confirmation telephone number from the client device 302. Some examples of the authentication reply module 314 may include a customized telephone application, a generic telephone application, a customized text messaging application or a customized text messaging application to send a mobile telephone reply. For example, the client device 302 may receive a text message including a confirmation telephone number for authorization with a text messaging application and may initiate a call using a telephone application to call the confirmation telephone number for authorization.

The computing device 330 may include a data store 336 having various information stored therein. Additionally, the computing device 330 may include various modules such as a content management module 350, an account management module 352, a session management module 354, an authentication management module 356 and other modules to implement functionality described herein.

The content management module 350 may provide content to the user base as drawn in part from an account data store 340, a session data store 342 and an authentication data store 344. The account data store 340, as an example, may include a username, an email, a password, a billing and shipping address, a contact telephone number, an order history, etc. The session data store 342 may contain, for instance, unique session identifiers, session encryption keys, a session reference to an associated record in the account data store, etc, One example use of the account data store 340 and the session data store 342 might be an electronic retail site which may provide different content to a user based in part on whether the user's browser has an authenticated session and which account the authenticated session is associated with. In this way, the computing device 330 may use information stored in the account data store 340 and the session data store 342. Accordingly, the account management module 352 and the session management module 354 may provide the functionality to access and manipulate the information stored in the account data store 340 and the session data store 342. Certain product recommendations, for example, may be provided to the user by the content management module 350.

The account management module 352 may allow a user to create or manage accounts. As one example, the account management module 352 may allow a user to provide a mobile telephone number to the computing device 330 for mobile telephone authentication.

The session management module 354 may allow a user to specify parameters for sessions with the site. A user, for instance, may specify which parts of the user's account data store 340 may be accessed with certain types of authentication. A password authentication may be set to allow purchases with existing payment information while a mobile telephone authentication may be allowed to add or modify payment information or vice versa.

The authentication management module 356 may interact with the telephone bank 326 and the client device 302 to authenticate the user. A user may request authentication by using the client device 302 or some other device. After the user requests authentication, a message may be sent to the client device 302. For example, a text message may be sent over the PSTN 324 using the telephone bank 326. The authentication management module 356 may retrieve a mobile telephone number associated from the account data store 340 and send a message including a confirmation telephone number for authorization to the client device 302.

The authentication management module 356 may then identify a mobile telephone reply received by the telephone bank 326 from the client device 302. The mobile telephone reply, for instance, may be an unanswered incoming telephone call to the telephone bank 326, or may be any sort of reply authentication from the client device 302, such as a text message to the telephone bank 326.

Other modules and/or data stores may also be included with the computing device 330 or additional functionality may be incorporated into the modules and/or data stores heretofore described.

In another example configuration, a passcode may be sent with the message or a period for authentication may be limited in duration to increase security. For example, a passcode may be sent with the text message and may be received as part of the incoming telephone call. For instance, the user may enter a PIN using a touch tone dial pad on the mobile telephone or may speak to spell out a passcode to the telephone bank 326. In that way, the telephone bank 326 may use voice recognition for inputting the passcode. Further, as discussed above, security may be increased by configuring the incoming telephone call to authenticate with a predetermined number of rings.

An application on a smart mobile telephone may also be used as a convenience to the user to help streamline some of the authentication functionality. More specifically, the mobile telephone reply may be a semi-automated reply by the application on the mobile telephone, as described briefly earlier. The application, for instance, may intercept the message that includes the confirmation telephone number for authorization. The application may then request permission from the user to effectuate the mobile telephone reply to the confirmation telephone number. The user, for instance may be prompted to click a button to signal permission in sending the mobile telephone reply. The application may then send a mobile telephone reply, including for example, a text message or a telephone call to the confirmation telephone number. Further, security may be increased by use of such an application. Information such as an IMEI may be included during the authentication using such an application.

The functionality of the system 300, and other functionality described herein, may be embodied on a non-transitory machine readable storage medium having a plurality of instructions adapted to be executed to implement the aforementioned functionality.

The network 318 may include any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired or wireless connections and combinations thereof.

The client device 302 may be an example of a smart phone client running applications, such as a browser. Moreover, client applications (e.g., a web application) may run within the browser and the client device 302 may have a display 316 for displaying pages rendered within the browser to interface with the user.

Based on the aforementioned parameters, the client device 302 may be a device such as, but not limited to, a cell phone, a smart phone, a tablet, a handheld messaging device, a laptop with a cellular modem, a cellular Internet access device, a mobile device with 3G or 4G cellular access, or any electronic device with access to a telephone number that may receive and present the information.

The computing device 330 may comprise, for example, a server computer or any other system providing computing capability. Alternatively, a plurality of computing devices 330 may be employed that are arranged, for example, in one or more server banks or computer banks or other arrangements. For purposes of convenience, the computing device 330 may be referred to in the singular, but it is understood that a plurality of computing devices 330 may be employed in various arrangements as described above.

Various processes and/or other functionality, as discussed herein, may be executed in the system 300 according to various examples. The computing device 330, may for example, provide some central server processing services while the client device 302 may provide local processing services and interface processing services to interface with the services of the computing device 330. Therefore, it is envisioned that processing services, as discussed herein, may be centrally hosted functionality or a service application that may receive requests and provide output to other services or customer devices.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the client device 302, a processor 332 may provide processing instructions by communicating with a memory 334 on the computing device 330. That is, the memory device may include instructions operable to be executed by the processor to perform a set of actions. The processor 332 and/or the memory 334 may directly or indirectly communicate with a data store 336.

Various data may be stored in the data store 336 that is accessible to the computing device 330. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 336 may include storage systems such as a SAN (Storage Area Network), cloud storage network, volatile or non-volatile RAM, optical media, or hard-drive type media. The data store 336 may be representative of a plurality of data stores 336.

Figure 4:
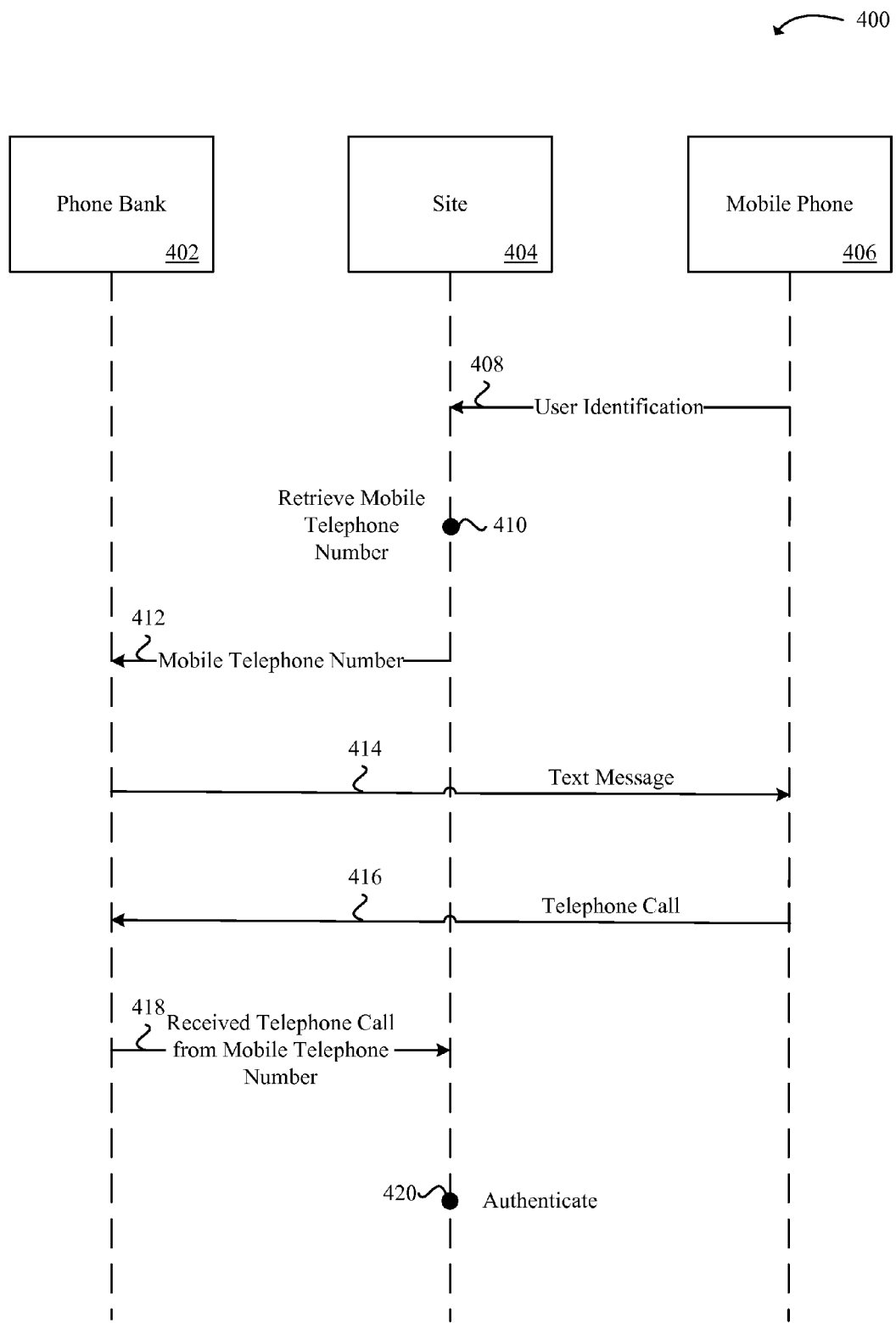
FIG. 4 is a sequence chart illustrating an example authentication method using a telephone call to authenticate.

FIG. 4 is a sequence chart illustrating an example authentication method 400 using a telephone call to authenticate. The authentication method 400 may include a telephone bank 402, a site 404 and a mobile telephone 406. The site 404 may be powered by the computing device 330 discussed with reference to FIG. 3, for example. While the telephone bank 402 may correspond to the telephone bank 326 discussed with reference to FIG. 3. Similarly the mobile telephone 406 may be an implementation of the client device 302 discussed in FIG. 3. The telephone bank 402 and the site 404 may be integrated into a single system or may communicate over a network to effectuate the functionality described herein.

The user may provide a user identification 408 to the site 404 using the mobile telephone 406 or another device communicatively connected to the site 404. The site 404 may then retrieve the mobile telephone number 410 previously provided to the site 404. Having retrieved the mobile telephone number 410 for a data store, the site 404 may provide the mobile telephone number to the telephone bank 402.

Using the mobile telephone number 412, the telephone bank 402 may then send a text message 414 to the mobile telephone 406. The text message 414, for instance, may be message similar to the message 104 depicted in FIG. 1. That is, the text message 414 may request that the user places a telephone call via a link containing a confirmation telephone number to complete the authentication. The confirmation telephone number may be dynamically selected from a group of telephone numbers in the telephone bank 402. Accordingly, the mobile phone 406 may place a telephone call 416 to the telephone bank 402. The telephone bank 402 may inform the site 404 that the telephone bank 402 has received a telephone call from the mobile telephone number, as indicated by 418. The mobile phone 406 may then be granted authentication 420 by the site 404. The authentication security may be enhanced through having the telephone bank 402 authenticate the mobile telephone 406 to the site with a predetermined number of rings.

While FIG. 4 depicts the mobile telephone providing the user identification 408, and describes authentication being granted 420 to the mobile telephone, a user may use a separate browser on a separate device to provide the user identification. Authentication may then take place using the mobile telephone and access may be granted to the separate browser.

Figure 5:
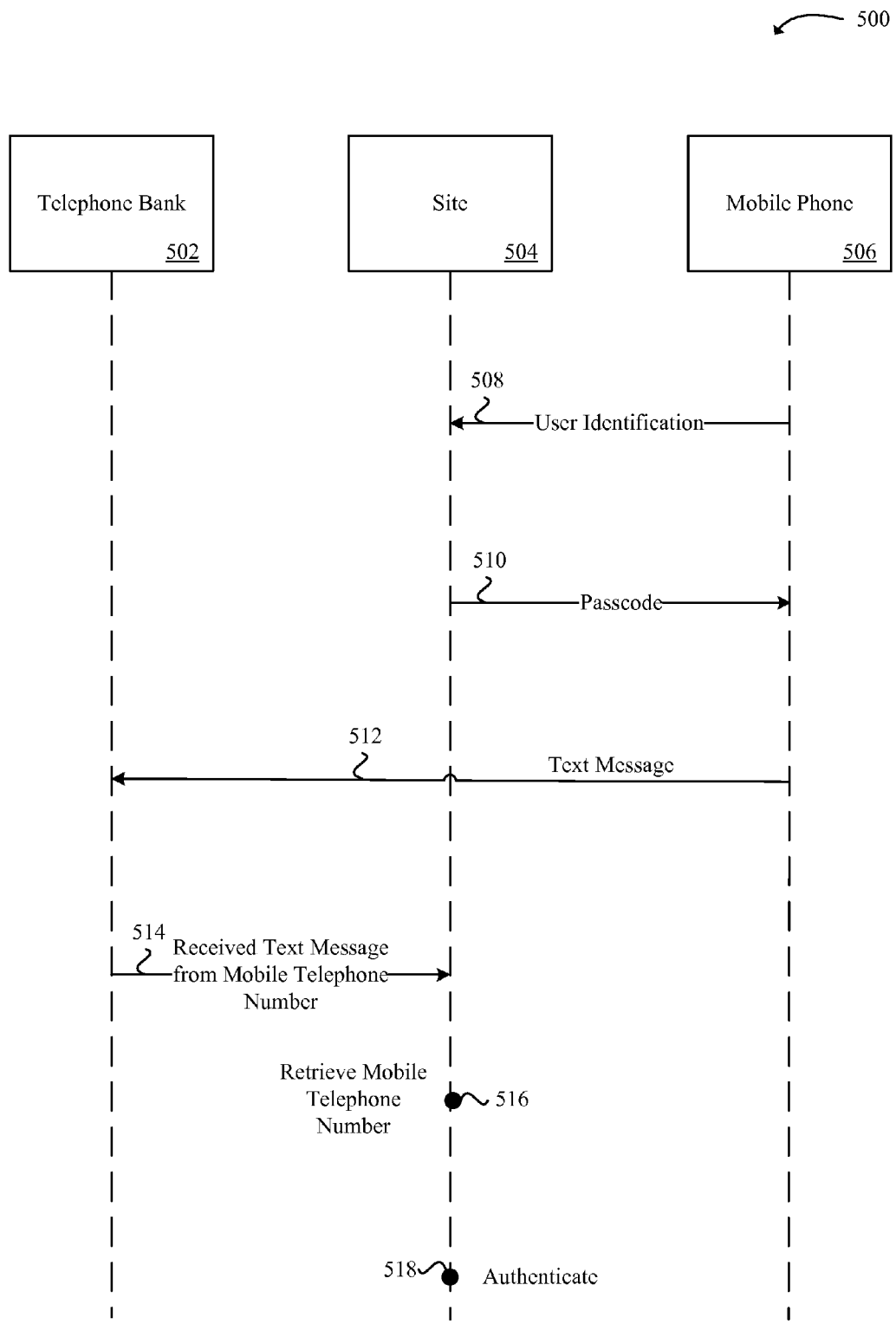
FIG. 5 is a sequence chart illustrating an example authentication method using simple message service (SMS).

FIG. 5 is a sequence chart illustrating an example authentication method 500 using a simple message service (SMS). Similar to FIG. 4, the authentication method 500 in FIG. 5 may include a telephone bank 502, a site 504 and a mobile telephone 506. Likewise, the site 504 may be served from the computing device 330 discussed with reference to FIG. 3, for example. While the telephone bank 502 may correspond to the telephone bank 326 discussed with reference to FIG. 3. Similarly the mobile telephone 506 may be an implementation of the client device 302 discussed in FIG. 3. The telephone bank 502 and the site 504 may be integrated into a single system or may communicate over a network to effectuate the functionality described herein.

The user may provide a user identification 508 to the site 504 using the mobile telephone 506 or another device communicatively connected to the site 504. A passcode 510 may then be provided to the mobile telephone 506. The passcode 510 may be provided from the site 504 as a response page to the submission of the user identification 508. Alternatively, the passcode 510 may be provided by the telephone bank 502. For example, the passcode 510 may be in a text message sent to the mobile telephone 506. In this case, the telephone bank 502 may be provided a mobile telephone number from the site 504 based on the user identification 508 provided to the site 504. The passcode 510 transmission may also include a confirmation telephone number to text message the passcode to for authentication. The confirmation telephone number may be dynamically selected from a group of telephone numbers in the telephone bank 502. Accordingly, the mobile phone 506 may send a text message 512 to the confirmation telephone number in the telephone bank 502. The text message 512 may include the passcode 510 as part of the text message 512. The telephone bank 502 may inform the site 504 that the telephone bank 502 has received a text message from the mobile telephone number, as indicated by 516. In some configurations, the telephone bank 502 and the site 504 may be integrally located. For instance, the telephone bank 502 and the site 504 may be software components (e.g. a software PBX and a web server software) running on a common server. The site 504 may then retrieve the mobile telephone number 516 and compare the mobile telephone number with the text message 512 sent by the mobile telephone 506 of the user identification 508. If correctly matched, the site 504 may then grant authentication 518 to the site 504. Security may be reinforced by only allowing authentication of the user identification for a limited duration.

While FIG. 5 depicts the mobile telephone providing the user identification 508, and describes authentication being granted 518 to the mobile telephone, a user may use a separate browser on a separate device to provide the user identification. Authentication may then take place using the mobile telephone and access granted to the separate browser.

Figure 6:
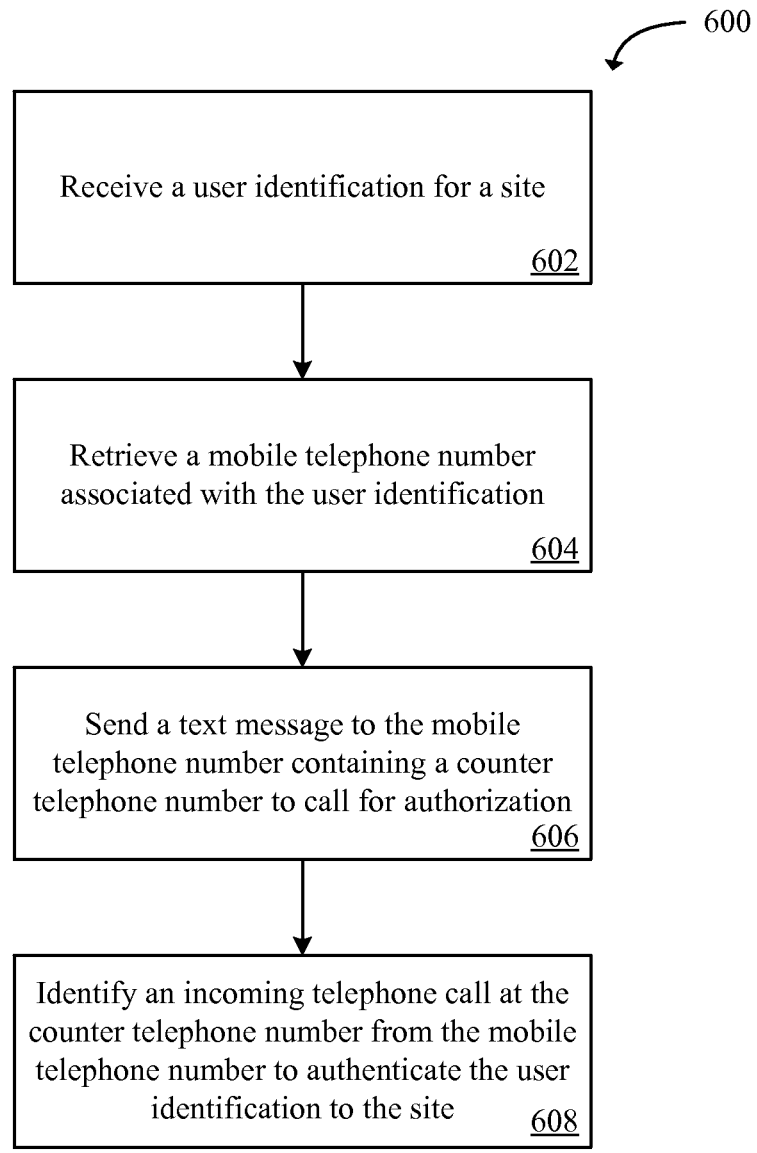
FIG. 6 is a flowchart illustrating an example authentication method.

FIG. 6 is a flowchart illustrating an example authentication method 600. The method 600 may include the operation of receiving a user identification for a site as shown in method element 602. For example, a page on a site may be provided to allow a user to log in to the site. The page may request, for instance, an email address or a username and may provide an option for using a mobile telephone to authenticate. By submitting the page with the user identification, the user may request an authentication. A protocol such as the hypertext transfer protocol (HTTP) may be used to deliver the page and submission.

The method 600 may also include retrieving a mobile telephone number associated with the user identification as shown in method element 604. A database or other type of data store may be used to provide relational storage to relate a user identification with a mobile telephone number. In this way, the mobile telephone number may be associated with the user identification.

The method 600 may also include sending a text message to the mobile telephone number as shown in method element 606. The text message may contain a confirmation telephone number to call for authorization. The text message may for instance include a confirmation telephone number with a link or a call button to help direct the user to complete authentication. The method 600 may further include identifying an incoming telephone call at the confirmation telephone number from the mobile telephone number to authenticate the user identification to the site as shown in method element 608.

One example use of the technology may be in an electronic retail site. Electronic retail sites generally authenticate a user in order to complete an order. Moreover, electronic retail sites often store personal information such as payment information, shipping and billing addresses, pending orders and order histories, as a few examples. An account with an electronic retailer may help facilitate some of these functions. In particular, an account is a way to authenticate the user so that personal information is delivered to those that have been properly authenticated. Using the technology, a user may be able to visit a site and authenticate by providing an identification (e.g. an email address or a telephone number). The technology may then authenticate the user by sending, for example, a text message to a mobile telephone number associated with the identification. Once authenticated, the user may browse the electronic retail site as an authenticated user. The user, for example may view the order history associated with the identification and place orders using previously entered payment information and shipping addresses.

Figure 7:
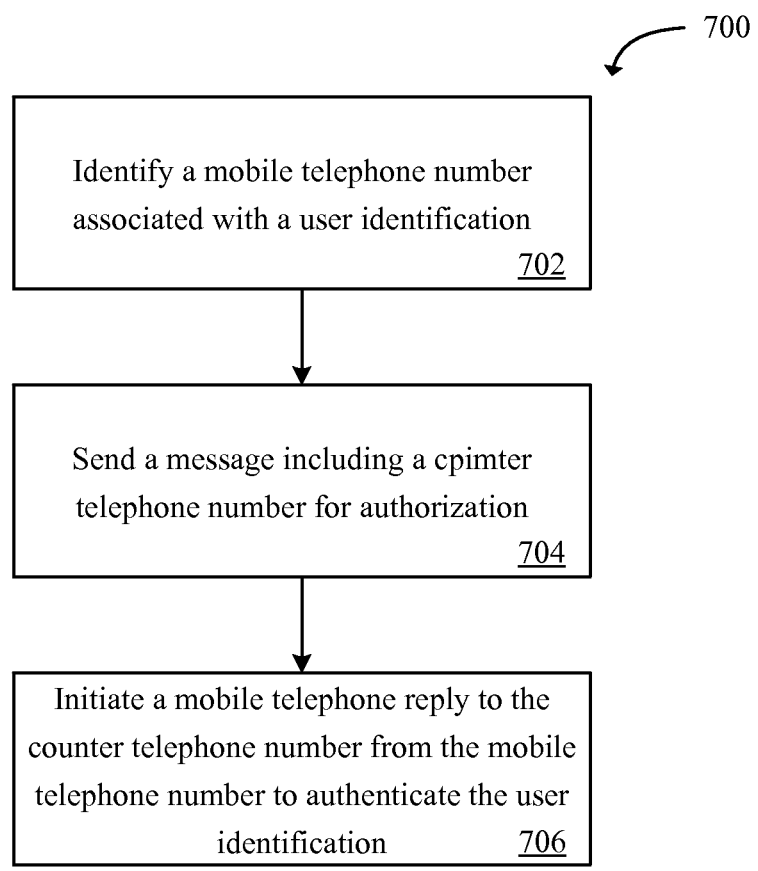
FIG. 7 is a flowchart illustrating another example authentication method.

FIG. 7 is a flowchart illustrating another example authentication method 700. The method 700 may include identifying a mobile telephone number associated with a user identification as shown in method element 702. In doing so, the technology may allow authentication to a site without using a password. As a result, the security of the site may be increased since users may not maintain passwords that might be used across multiple sites.

The method 700 may also include sending a message including a confirmation telephone number for authorization as shown in method element 704, and initiating a mobile telephone reply to the confirmation telephone number from the mobile telephone number to authenticate the user identification as shown in method element 706. This technology may also allow commercial sites to provide an easier method for authentication that does not require creation and memorization of more passwords. In that way, user may be more readily encouraged to create an authentication account at a site. The technology may be particularly useful for devices that have limited means to enter text. With the technology, a user may be able to authenticate to a site with a minimal amount of text entry.

Figure 8:
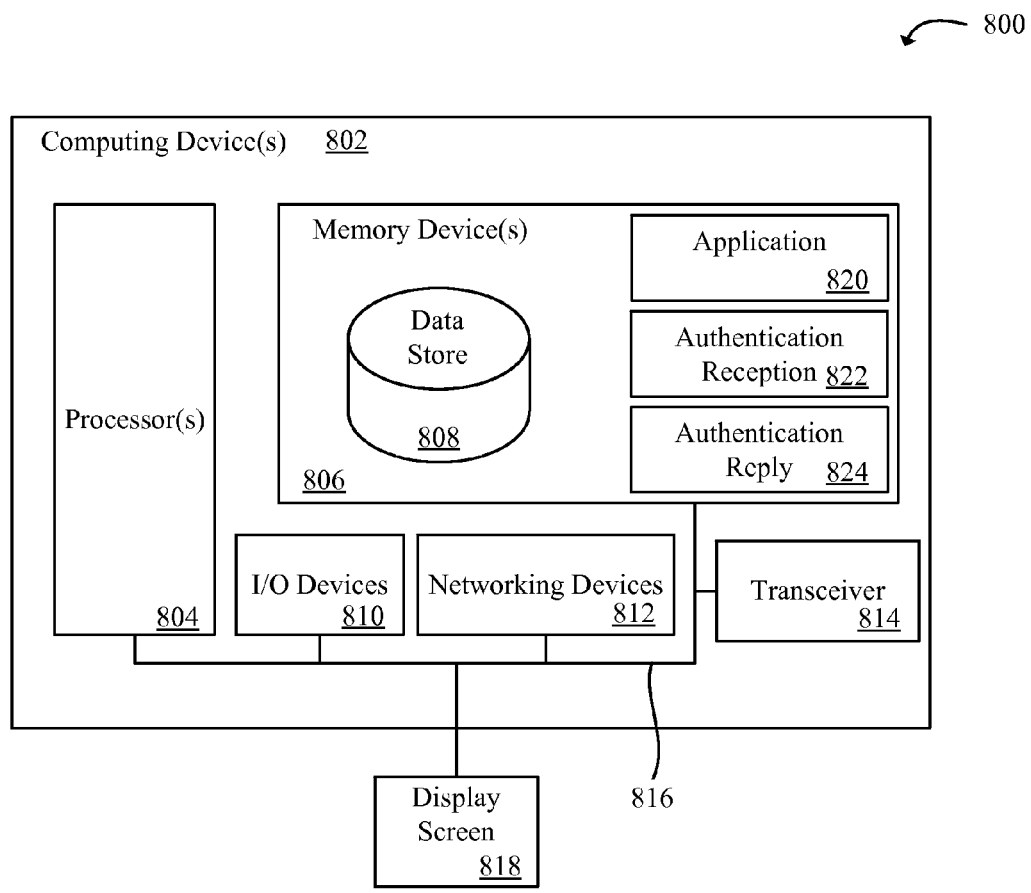
FIG. 8 is block diagram illustrating an example of a computing device that may be used for authentication.

FIG. 8 is block diagram 800 illustrating an example of a computing device 802 that may be used for authentication. In particular, the computing device 802 illustrates a high level example of a device on which modules of the disclosed technology may be executed. The computing device 802 may include one or more processors 804 that are in communication with memory devices 806. The computing device 802 may include a local communication interface 816 for the components in the computing device. For example, the local communication interface 816 may be a local data bus and/or any related address or control busses as may be desired.

The computing device 802, for instance, may be used for authentication. For example, the computing device 802 may be used to retrieve a mobile telephone number associated with a user's identification. The computing device 802 may send a message including a confirmation telephone number for authorization. The computing device 802 may then identify a mobile telephone reply at the confirmation telephone number from the mobile telephone number to authenticate the user identification.

The computing device 802 may alternatively be a mobile telephone device capable of authentication and include a transceiver 814 to communicatively connect to a wireless mobile network. A wireless mobile network may be a radio network distributed through a geographic area with cellular coverage areas served by a base station. In particular, the memory device 806 may contain modules that are executable by the processor(s) 804 and data for the modules.

Located in the memory device 806 are modules executable by the processor. For example, an application module 820, an authentication reception module 822, an authentication reply module 824 and other modules may be located in the memory device 806. The modules may execute the functions described earlier. For instance, the application module 820 may interact with a site and request an authentication. The authentication reception module 822 may receive a message including a confirmation telephone number for authorization in response to initiating the authentication. The authentication reply module 824 may send a mobile telephone reply (i.e., make a call) to the confirmation telephone number from the mobile telephone device.

A data store 808 may also be located in the memory device 806 for storing data related to the modules and other applications along with an operating system that is executable by the processor(s) 804.

Other applications may also be stored in the memory device 806 and may be executable by the processor(s) 804. Components or modules discussed in this description that may be implemented in the form of software using high programming level languages that are compiled, interpreted or executed using a hybrid of the methods.

The computing device may also have access to I/O (input/output) devices 810 that are usable by the computing devices. An example of an I/O device is a display screen 818 that is available to display output from the computing devices. Other known I/O devices may be used with the computing device as desired. Networking devices 812 and similar communication devices may be included in the computing device. The networking devices 812 may be wired or wireless networking devices that connect to the internet, a LAN, WAN, or other computing network.

The components or modules that are shown as being stored in the memory device 806 may be executed by the processor(s) 804. The term "executable" may mean a program file that is in a form that may be executed by a processor 804. For example, a program in a higher level language may be compiled into machine code in a format that may be loaded into a random access portion of the memory device 806 and executed by the processor 804, or source code may be loaded by another executable program and interpreted to generate instructions in a random access portion of the memory to be executed by a processor. The executable program may be stored in any portion or component of the memory device 806. For example, the memory device 806 may be random access memory (RAM), read only memory (ROM), flash memory, a solid state drive, memory card, a hard drive, optical disk, floppy disk, magnetic tape, or any other memory components.

The processor 804 may represent multiple processors and the memory device 806 may represent multiple memory units that operate in parallel to the processing circuits. This may provide parallel processing channels for the processes and data in the system. The local communication interface 816 may be used as a network to facilitate communication between any of the multiple processors and multiple memories. The local communication interface 816 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method of authentication, comprising:
under control of one or more computer systems configured with executable instructions:
receiving a user identification for an electronic site accessed from a browser via a first network over internet, wherein the user identification comprises a device International Mobile Station Equipment Identity (IMEI);
retrieving a mobile telephone number associated with the user identification;
sending a text message from the electronic site wirelessly to the mobile telephone number using a simple message service (SMS), the text message containing a confirmation telephone number of a telephone bank to call for authorization, wherein the text message is sent via a second network;
identifying an incoming telephone call at the confirmation telephone number of the telephone bank from the mobile telephone number;
authenticating the incoming telephone call with a predetermined number of rings to authenticate the user identification to the electronic site; and
upon successful authentication of the incoming telephone call, allowing access to the electronic site via the browser over the first network.

2. The method of claim 1, further comprising sending a passcode with the text message and receiving the passcode in the incoming telephone call.

3. The method of claim 1, wherein the confirmation telephone number is randomly selected from a group of telephone numbers.

4. The method of claim 1, wherein authentication of the user identification to the electronic site using the confirmation telephone number is limited in duration.

5. A method of authentication, comprising:
under control of one or more computer systems configured with executable instructions:
identifying a mobile telephone number associated with a user identification via a second network, wherein the user identification comprises a device International Mobile Station Equipment Identity (IMEI);
sending a text message from an electronic site accessed via a first network over internet to the mobile telephone number, the text message including a confirmation telephone number of a telephone bank for authorization, wherein the text message is sent wirelessly using a simple message service (SMS);
initiating a mobile telephone reply to the confirmation telephone number of the telephone bank from the mobile telephone number to authenticate the user identification for the electronic site accessed via internet;
authenticating the mobile telephone reply with a predetermined number of rings to authenticate the user identification to the electronic site; and
upon successful authentication of the mobile telephone reply, allowing access to the electronic site via the second network.

6. The method of claim 5, wherein the mobile telephone reply is an incoming telephone call at the confirmation telephone number from the mobile telephone number to authenticate the user identification.

7. The method of claim 5, further comprising sending a passcode with the text message.

8. The method of claim 7, wherein the mobile telephone reply is an incoming text message at the confirmation telephone number from the mobile telephone number with the passcode to authenticate the user identification.

9. The method of claim 5, wherein the confirmation telephone number is valid for authentication for a predetermined amount of time.

10. The method of claim 5, further comprising associating a device International Mobile Station Equipment Identity (IMEI) with the mobile telephone number, wherein initiating the mobile telephone reply includes verifying the IMEI of the mobile telephone reply.

11. The method of claim 10, wherein the mobile telephone reply is a semi-automated reply by an application on the device in which a user interacts with the application to effectuate the mobile telephone reply.

12. The method of claim 5, wherein the confirmation telephone number is dynamically selected from a group of telephone numbers.

13. The method of claim 5, wherein authentication of the user identification to is limited in duration and functionality.

14. A mobile telephone device, comprising:
a processor;
a memory device including instructions, which when executed by the processor, cause the processor to:
provide communication between the mobile telephone device and a wireless mobile network;
interact with an electronic site via a first network over internet and request for authentication, wherein the request for authentication includes a user identification comprises a device International Mobile Station Equipment Identity (IMEI);
receive a text message from the electronic site via a second network, the text message including a confirmation telephone number of a telephone bank for authorization in response to initiating the request for authentication, wherein the text message is received wirelessly using a simple message service (SMS);
send a mobile telephone reply to the confirmation telephone number of the telephone bank from the mobile telephone device; and receive access to the electronic site via the first network after the mobile telephone reply is authenticated with a predetermined number of rings to authenticate the user identification to the electronic site.

15. The device of claim 14, wherein the mobile telephone reply is a telephone call to the confirmation telephone number from the mobile telephone device.

16. The device of claim 14, wherein the message includes a passcode.

17. The device of claim 16, wherein the mobile telephone reply is a text message to the confirmation telephone number from the mobile telephone device with the passcode included in the text message.

* * * * *